US009183577B2

(12) United States Patent
Mhatre

(10) Patent No.: US 9,183,577 B2
(45) Date of Patent: Nov. 10, 2015

(54) SELECTION OF IMAGES TO DISPLAY NEXT TO TEXTUAL CONTENT

(71) Applicant: Google Inc., Mountain View, CA (US)

(72) Inventor: Amit Mhatre, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/147,774

(22) Filed: Jan. 6, 2014

(65) Prior Publication Data

US 2014/0122259 A1 May 1, 2014

Related U.S. Application Data

(63) Continuation of application No. 13/470,650, filed on May 14, 2012, now Pat. No. 8,626,585.

(51) Int. Cl.
*G06Q 30/00* (2012.01)
*G06Q 30/02* (2012.01)

(52) U.S. Cl.
CPC ........ *G06Q 30/0277* (2013.01); *G06Q 30/0244* (2013.01); *G06Q 30/0276* (2013.01)

(58) Field of Classification Search
CPC ................................................ G06Q 30/0244
USPC ...................................................... 705/14.43
See application file for complete search history.

(56) References Cited

U.S. PATENT DOCUMENTS

| 7,697,791 | B1 | 4/2010 | Chan | |
| 7,996,753 | B1 | 8/2011 | Chan | |
| 2007/0192164 | A1 | 8/2007 | Nong | |
| 2008/0059311 | A1 | 3/2008 | Moore | |
| 2009/0012863 | A1 | 1/2009 | Saephan | |
| 2010/0036883 | A1* | 2/2010 | Valencia-Campo et al. | 707/104.1 |
| 2010/0131355 | A1 | 5/2010 | Kitchen | |
| 2010/0262616 | A1 | 10/2010 | Eskolin | |
| 2011/0040604 | A1 | 2/2011 | Kaib | |
| 2011/0040612 | A1 | 2/2011 | Simmons | |
| 2011/0058734 | A1 | 3/2011 | Li | |
| 2011/0113047 | A1* | 5/2011 | Guardalben | 707/754 |

* cited by examiner

*Primary Examiner* — John G Weiss
*Assistant Examiner* — Scott C Anderson
(74) *Attorney, Agent, or Firm* — Fish & Richardson P.C.

(57) ABSTRACT

Methods, systems, and apparatus, including computer programs encoded on a computer storage medium, for selecting thumbnail images to display with text advertisements. In one aspect, a method includes identifying landing page non-textual content items from a landing page to which the textual content item links and which a user device requests when the textual content item is selected at the user device; for each landing page non-textual content item, determining a relevance measure that measures the relevance of the landing page non-textual content item to the content of the landing page; selecting one or more of the landing page non-textual content items for display with the textual content item based on the relevance measures of the landing page non-textual content items; and storing, in a data storage system, data associating the selected landing page non-textual contents with the textual content items.

20 Claims, 5 Drawing Sheets

SELECTION OF IMAGES TO DISPLAY NEXT TO TEXTUAL CONTENT

BACKGROUND

This specification relates to online content provisioning.

The Internet provides access to a wide variety of resources, such as video and/or audio files, and web pages for particular subjects. Access to these resources has provided opportunities for content items to be provided with the resources. There are many different types of content items that can be provided, such as video items, text items, audio items, image items, and combinations thereof. For example, some online content items include a text portion and an image portion. The performance of an online content item is often affected by the form of media used to present the content item.

Some advertisements only include a textual portion. In such cases the content item could be enhanced by accompanying the textual portion by an image portion to display jointly to users. However, unless a content item provider specifies an image or images to be provided with the textual portion, selecting a suitable image to display is a time-intensive process that involves a manual search of images and review of the images and the textual portion.

SUMMARY

In general, one innovative aspect of the subject matter described in this specification can be embodied in methods that include the actions of, for each of one or more textual content items of a sponsor of the textual content items: identifying landing page non-textual content items from a landing page to which the textual content item links and which a user device requests when the textual content item is selected at the user device, for each landing page non-textual content item, determining a relevance measure that measures the relevance of the landing page non-textual content item to the content of the landing page, selecting one or more of the landing page non-textual content items for display with the textual content item based on the relevance measures of the landing page non-textual content items; and storing, in a data storage system, data associating the selected landing page non-textual contents with the textual content items. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The automated image selection scheme can be implemented hierarchically so that images that are most likely to be highly relevant to the textual cotenant are more likely to be selected for display with the textual content. This results in the capability of providing virtually all text content with highly relevant images without a significant investment in time and resources. Furthermore, the automated process can be implemented by third parties (e.g., in the case of advertising textual content, a company that maintains an advertising service used by multiple advertisers), thus allowing a third party to add value to a textual advertisement at little or no expense to the advertiser that provides the advertisement. Additionally, in the case of text advertisements, showing relevant images with corresponding text advertisements increases the likelihood of user interaction with the advertisement.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The systems and methods described herein select non-textual content items for textual content items for displaying next to the textual content items. In some implementations, the textual content items are text advertisements, and the non-textual content items are images of products, services or content that are determined to be related to the text advertisement.

The system allows a sponsor of a textual content item (e.g., an advertiser) to specify one or more images for a text ad, and prioritizes these images for showing with the text ad. However, if images are not specified, the system scans the landing page of the text ad for images for use in generating thumbnail images. If the landing page has multiple images, the system prioritizes the images and selects the images according to the prioritization.

The system can also scan the text of the ad for advertising entities. An advertising entity is an advertiser or offering of the advertiser, such as advertiser names, product names, or brand names. The text specifying the advertising entities are used as image search queries to identify relevant images for the advertisements. The images are received in an order determined by a search engine, and images are selected for the advertisement, in part, based on the order.

In still further implementations, the system can maintain an association of images to verticals. The verticals are, for example, defined by groups of similar products, businesses and/or customers that engage in trade based on specific and specialized needs. The text ads are also associated with the verticals, and the system can use a vertical to which the text ad is associated to obtain an image to display with the text ad.

The three processes above can be performed in a hierarchal manner, such that in the absence of an express association of an image to a text advertisement by an advertiser, images from landing pages take precedence over images for advertising entities, and images for advertising entitles take precedence over images for verticals.

Potential collisions may occur if multiple text ads in a set of ads to be displayed have the same vertical or entity, resulting in the system showing the same image for two or more ads. To avoid these collisions, the system can maintain multiple images in the association of images to verticals, and use each image only once per display set of advertisements. The system can also ensure that images are selected from vertical images and entity images and also maintain backup generic images that can be shown if a selection collision occurs.

While the subject matter is described below in the context of an advertising system in which images are provided for text advertisements, any type of non-textual content can be selected for corresponding textual content by the subject matter described below. The corresponding textual content need not be an advertisement.

Example Operating Environment

Figure 1:
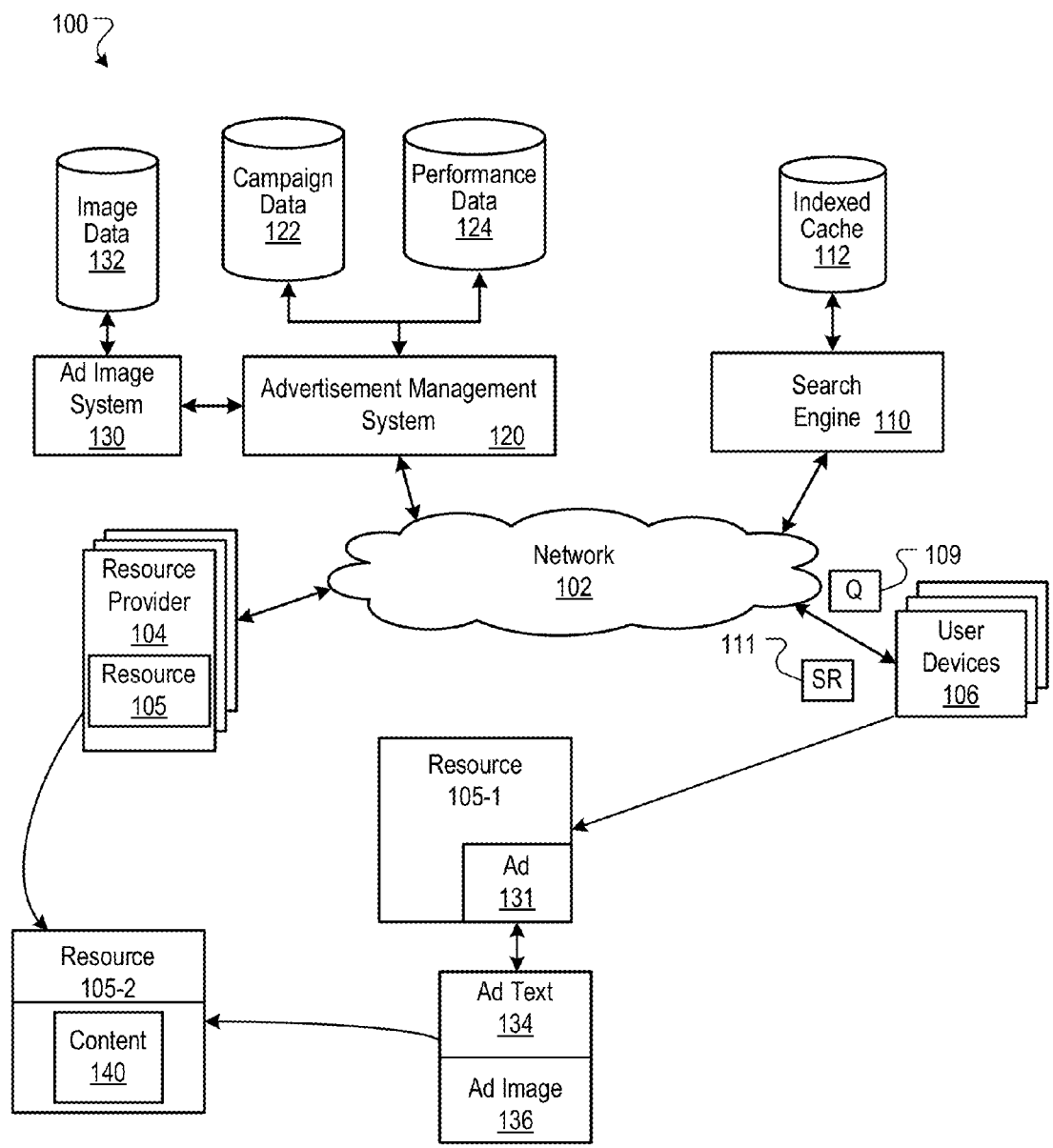
FIG. 1 is a block diagram of an example environment in which an advertisement management system provides advertisements that include a textual portion and an image portion.

FIG. 1 is a block diagram of an example environment 100 in which images are selected for text advertisements. A computer network 102, such as a local area network (LAN), wide area network (WAN), the Internet, or a combination thereof, connects resource providers 104, user devices 106, a search engine 110, and an advertisement management system 120. The online environment 100 may include many thousands of resource provider 104 and user devices 106.

One example of a resource provider is a resource provider website. A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content resource provider, which is an entity that controls, manages and/or owns the website 104.

A resource is any data that can be provided by the resource provider 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A user device 106 is an electronic device that is under the control of a user and is capable of requesting and receiving resources over the network 102. Example user devices 106 include personal computers, mobile communication devices, televisions, set-top boxes, video game consoles, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the World Wide Web or a local area network.

To facilitate searching of these resources 105, the search engine 110 identifies the resources by crawling the resource provider web sites 104 and indexing the resources provided by the resource provider web sites 104. The indexed and, optionally, cached copies of the resources are stored in an indexed cache 112.

The user devices 106 submit search queries 109 to the search engine 110. The search queries 109 are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the indexed cache 112 to identify resources that are relevant to the queries. The resources may be image resource, web page resources, video resources, or other resource types. The search engine 110 identifies the resources in the form of search results 111 and returns the search results to the user devices 106 in search results page resource. A search result is data generated by the search engine 110 that identifies a resource that satisfies a particular search query, and includes a resource locator for the resource. An example search result can include a web page title, a snippet of text extracted from the web page, or a thumbnail of an image, and the URL of the resource. The search results are ranked based on scores that are indicative of the relevance of the resource to the query. The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The resource provider of the web site 104 hosting the resource receives the request for the resource from the user device 106 and provides the resource to the requesting user device 106.

The advertisement management system 120 facilitates the provisioning of advertisements with the resources 105. In particular, the advertisement management system 120 allows advertisers to define selection rules that take into account attributes of the particular user and/or user device to provide relevant advertisements for the users. Example selection rules include keyword selection rules, in which advertisers provide bids for keywords that are present in either search queries or webpage content. The advertisements are auctioned based, in part, on the keyword bids. Advertisements for which an advertisement slot is awarded in response to the auction are selected for displaying in the advertisement slots.

When a user of a user device 106 selects an advertisement, the user device 106 generates a request for a landing page of the advertisement, which is typically a webpage of the advertiser. For example, for the particular user device 106 in FIG. 1, a resource 105-1 with an advertisement 131 is displayed. The advertisement 131 includes a link to a landing page, represented by resource 105-2. The landing page 105-2 is provided by a particular resource provider 104 hosting respective web pages, one of which is the landing page for the advertisement 131.

These advertisements can be provided for many different resources, such as the resources 105 of the resource providers 104, and on a search results page resource. For example, a resource 105 from a resource provider 104 includes instructions that cause the user device to request advertisements from the advertisement management system 120. The request includes a resource provider identifier and, optionally, keyword identifiers related to the content of the resource 105. The advertisement management system 120, in turn, provides relevant advertisements to the particular user device. With respect to a search results page, the user device renders the search results page and sends a request to the advertisement management system 120, along with one or more keywords related to the query that the user provide to the search engine 110. The advertisement management system 120, in turn, provides relevant advertisements to the particular user device.

The advertisement management system 120 includes a data storage system that stores campaign data 122 and performance data 124. The campaign data 122 stores advertisement information, selection information, and budgeting information for advertisers. The performance data 124 stores data indicating the performance of the advertisements that are served. Such performance data can include, for example, click through rates for advertisements, the number of impressions for advertisements, and the number of conversions for advertisements, information regarding selection, such as keywords that cause the advertisements to be served, and serving information, such as auction position information, ad slot information, and/or user device information associated with each impression. Other performance data can also be stored.

An advertisement image system 130 is a subsystem of the advertisement management system 120, and is responsible for selecting one or more images to associate with a text advertisement. In some implementations, advertisers may opt-in to having images automatically selected for display with their respective text advertisements. The selection of an image for a text advertisement can, for example, be conditioned on the advertiser not specifying a particular image or images to be associated with the text advertisement. For example, when creating a text advertisement for the advertisement management system 120, the advertiser may specify whether an image can be displayed with the text advertisement, and, if so, whether the advertiser prefers to provide an image or images, or whether the advertiser prefers that the ad image system 130 automatically select one or more images for the advertisement.

The advertisement image system 130 includes a data storage system that stores image data 132 that associates images with textual advertisements. The image data 132 can further include the selected images. Selection of the images and associating the images with advertisements is described in more detail with respect to FIGS. 2-5 below.

In operation, the advertisement management system 120 receives a request for an advertisement from a client device 106. The advertisement management system 120 selects an advertisement to provide to the client device based on campaign data 122 and performance data 124. In response to the advertisement management system 120 selecting a textual advertisement, the advertisement image system 130 selects an image for display with the textual advertisement based on image data 132. The advertisement management system 120, in turn, provides the associated image to the client device 106 for display with the textual advertisement.

Which images are selected for display with textual advertisements can depend on a variety of factors, such as the rank of an advertisement in an auction, the position of the advertisement on a page, and other factors. For example, in some implementations, in each advertisement block on a web page in which are displayed multiple advertisements, only the top-ranked advertisement in the ad block is selected for display with an image. In other implementations, all text advertisements can be displayed with images.

Image Selection

The advertisement image system 130 is also used to generate the image data 132. To generate the image data 132, the advertisement image system 130 identifies for each advertisement candidate images from multiple different image sources, and from these candidate images selects one or more images for association with the textual advertisement.

Figure 2:
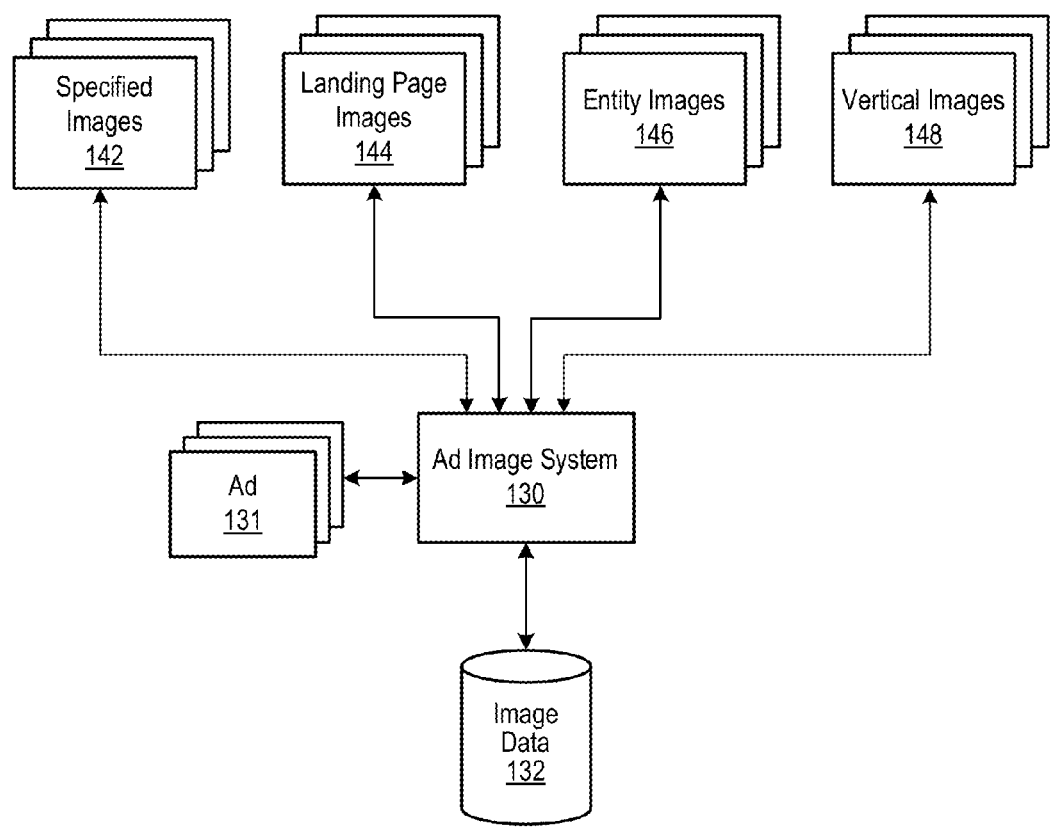
FIG. 2 is a block diagram illustrating an example process for selecting images for advertisements.
Figure 3:
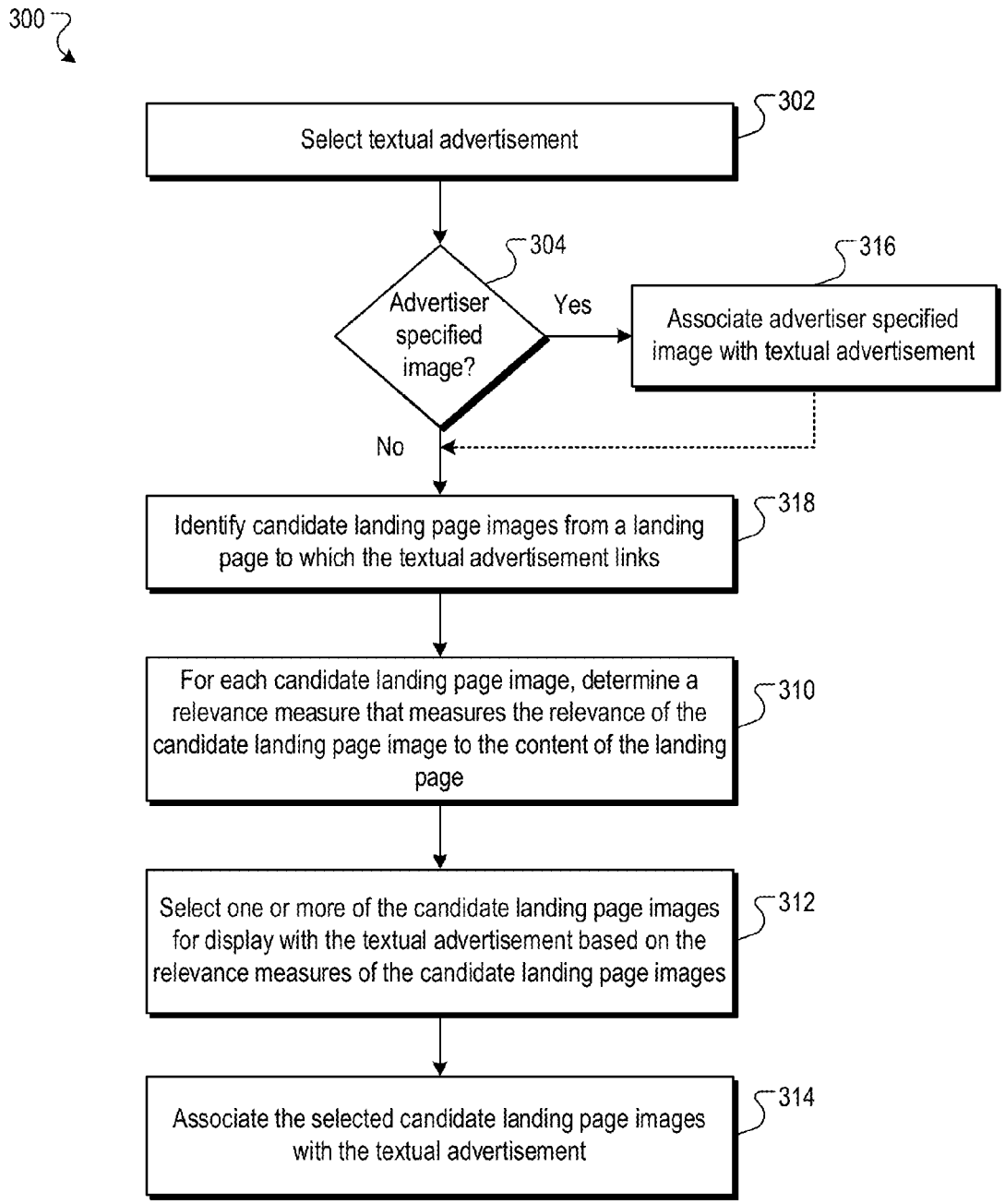
FIG. 3 is a flow diagram of an example process for selecting an image to associate with the textual advertisement.
Figure 4:
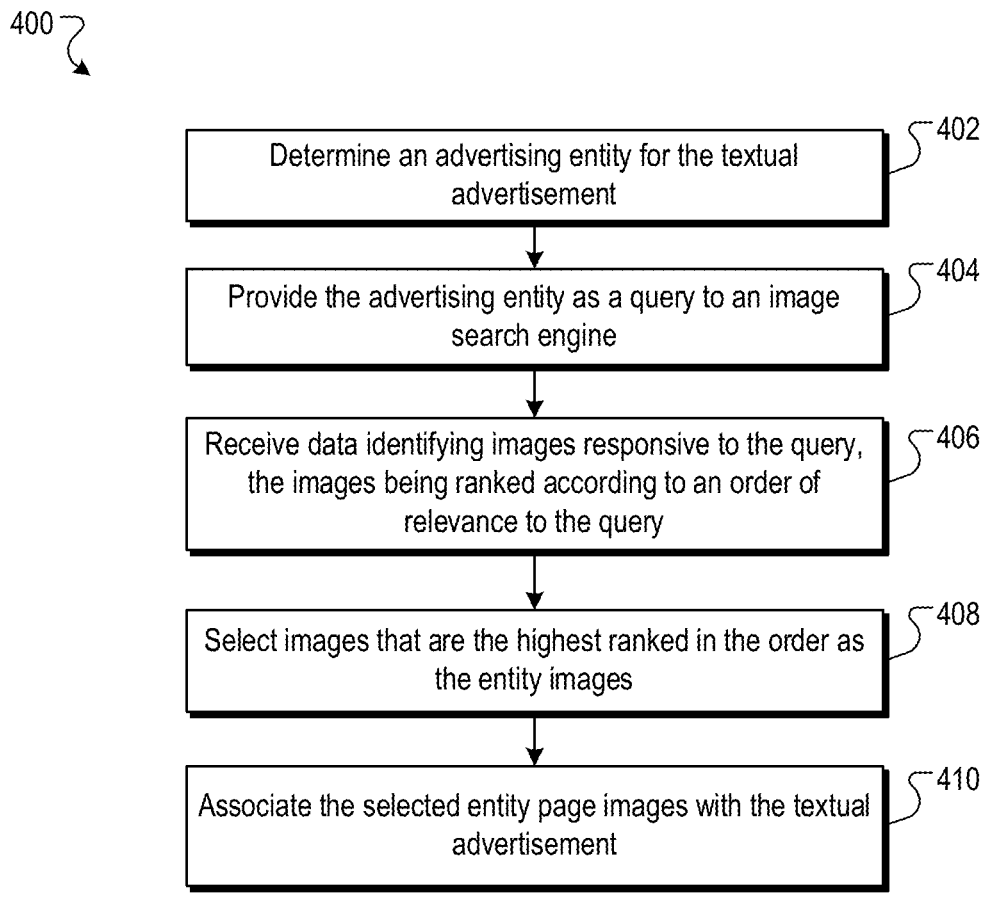
FIG. 4 is a flow diagram of an example process for selecting an image to associate with a textual advertisement based on an advertisement entity associated with the textual advertisement.
Figure 5:
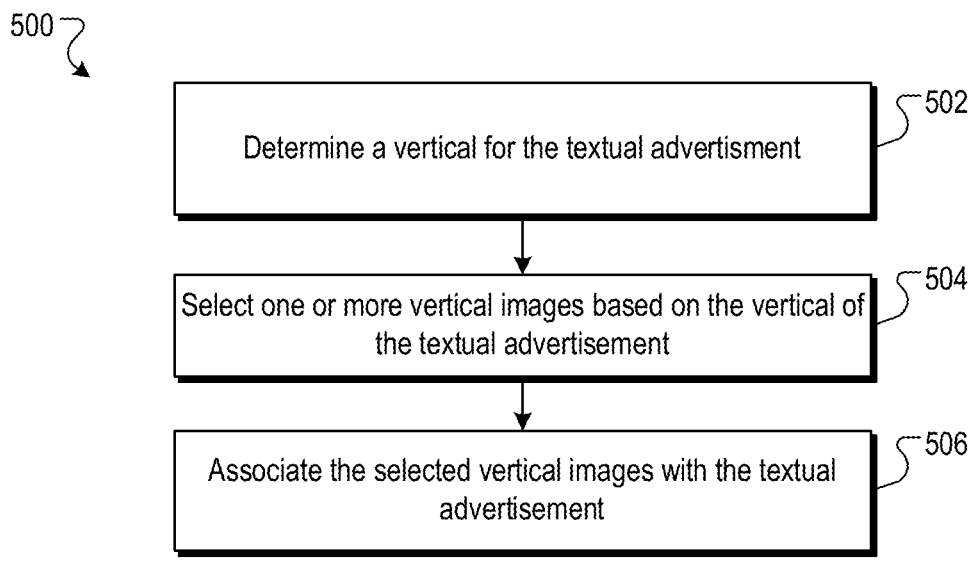
FIG. 5 is a flow diagram of an example process for selecting an image to associate with a textual advertisement based on a vertical associated with the textual advertisement.

FIG. 2 is a block diagram illustrating an example process for selecting images for association with an advertisement. The example process of FIG. 2 includes multiple methods to identify and select images for association with a textual advertisement, and each of the methods corresponds to a particular image source or corpus. FIGS. 3-5 each illustrate flow diagrams of example processes for each of these methods.

In some cases, the advertiser specifies images to be provided with particular advertisements. The specified images 142 are provided by the advertiser to associate with a textual advertisement. In such cases, the specified images 142 are provided with the textual advertisement to the client devices 106 for concurrent display.

For textual advertisements for which the advertiser has not specified an associated image, one or all of the multiple methods can be used to identify and select a suitable image to associate and display with the textual advertisement. For example, images can be selected from the landing page images, entity images or vertical images.

Example Process for Image Selection from a Landing Page

With respect to the landing page images, landing pages associated with a textual advertisement are scanned for images. A landing page of an advertisement is a page to which the user is redirected when a user selects the advertisement. A set of data describing the image in the context of the landing is determined for each of the images identified from scanning the landing page associated with the advertisement. Examples of such data include the location of the image on the rendered landing page, the dimensions of the image, and the resolution of the image. The data and image selection criteria are used to determine a measure of relevance of an image to the content of the associated landing page. The identified images are then ranked by the advertisement image system 130 according to the relevance measures.

For example, image selection criteria can specify that images must have a minimum resolution in order to be selected, and that the image cannot be in a frame that is a child of the landing page. Other criteria can include the rules regarding the size and dimension of an image to ensure that the image, when displayed in the allocated slot of the advertisement space, is visually appealing. For example, if the area allocated for the display of an image associated with a particular advertisement is such that a reduced version of the image in thumbnail form may not be visually appealing, then the image may not be selected. One way of making such a determination is by means of feature processing to determine feature values that describe image features, such as edges and color. For example, a relatively high density in detected edges in the full size version of the image may indicate that a thumbnail version of the image may not be visually appealing. Likewise, the advertisement image system 130 can be configured to exclude images that are smaller than a size defined by minimum dimensions.

Other rules and criteria can further be implemented to specify additional features required for an image to be selected by the advertisement image system 130. For example, the ad image system 130 can utilize an object detection service that detects objects (e.g., products, landmarks, etc.) in an image. If the page contains one or more keywords related to the detected object, then the particular image including the object would receive a boost in its relevance score. Other examples indicative of a high measure of relevance can include identifying an object within an image of a landing page and that is associated with a keyword from the textual advertisement.

FIG. 3 is a flow diagram of an example process 300 for selecting an image from a landing page of a textual advertisement to associate with the textual advertisement. The process 300 can be implemented in the advertisement image system 130, e.g., one or more computers and associated storage devices. The process is described in the context of an iterative example to illustrate the selection of an image to associate with the textual advertisement and how an image is selected from the landing page. The process 300 can be modified to operate in parallel with other instances of the process 300 or processes 400 and 500 (described below) so that the selected image is selected from the output of more than one process, depending on the system architecture used and processing capabilities available.

The process 300 selects a textual advertisement (302) and determines whether the advertiser has specified an image for association with the selected textual advertisement (304). If the advertiser specified such an image, process 300 associates the advertiser specified image with the selected textual advertisement (316). The association is persisted to the image data 132.

For a textual advertisement that the advertiser has not specified an image (or, optionally and as indicated by the dashed line, to associate additional images with the advertisement), the process 300 identifies a landing page image from a landing page to which the textual advertisement links (318). For each identified landing page image in the landing page, the process 300 determines a relevance measure that represents the relevance of the landing page image to the content of the landing page (310). For example, the process 300 can determine a relevance measure that represents the relevance of the content of the landing page to the landing page image by object detection in the image and comparing the detected object to keywords in the landing page. To illustrate, assume the textual advertisement redirects a user to a landing page for shoes offered by an online clothing store, and the keywords "shoes" and "boots" are be detected as keywords that appear frequently in the landing page. The context of the landing page, in such case, could be identified as, for example, footwear. A measure of relevance between each identified image from the landing page and the context footwear is determined. For example, an image containing the tennis shoes would receive a higher relevance measure than an image containing a belt that is used as in image link to a page in which are listed belts offered by the online clothing store.

Alternatively or in addition, the process can determine a size of the landing page image and determine a relevance measure that has magnitude that is, in part, proportional to the size of the image. The size of the image is the area of the image on the landing page, e.g., the vertical and horizontal dimensions of the image. This excludes small images that may lack detail or substance.

The process 300 selects one or more of the candidate landing page images for display with the textual advertisement based on the relevance measures of the image (312), and associates the selected landing page images with the textual advertisement (314). For example, the images identified from the landing page are ranked based on the relevance measures, and one or more images are selected from the highest ranking images and associated with the advertisement. The highest ranking images may be determined, for example, as images for which a relevance measure is above a threshold, the top N images, or the images in the top X% of ranked images, for example. The associations are then persisted in the image data 132.

Example Process for Image Selection from Entity Images

With respect to entity images, the textual advertisement is scanned for entities, e.g., text of a name identifying an advertiser or describing a product. In response to identifying a particular entity in a textual advertisement, the advertisement image system 130 provides the text describing the entity to a search engine that conducts and image search, and that returns a list of ranked images that are determined to be responsive to the search. In some implementations, one or more of the highest ranking more images are selected for association with the textual advertisement. In variations of this implementation, the images are re-ranked, in part, based on selection criterion similar to the criterion discussed above, e.g., image size, image features, etc. Data associating the selected entity images with the textual advertisement are then stored in the image data 132.

FIG. 4 is a flow diagram of an example process 400 for selecting an image to associate with the textual advertisement, based on an advertisement entity associated with the textual advertisement. The process 400 can be implemented in the advertisement image system 130, e.g., one or more computers and associated storage devices. The process is described in the context of an iterative example to illustrate the selection of an image to associate with the textual advertisement and how an image is selected based on the advertisement entity. The process 400 can be modified to operate in parallel with other instances of the process so that the selected image is selected from the output of more than one process, depending on the system architecture used and processing capabilities available.

The process 400 determines an advertising entity for the textual advertisement (402). The advertising entities for the textual advertisement can be determined, for example, by selecting keywords from the textual advertisement that specify one of a product or service described in the textual advertisement. In some implementations, a keyword list is included in the advertisement image system 130 to ensure that keywords specified by the list are not provided as a query to the image search engine 110. The advertisement image system 130 can employ further filtering and selection criteria for selecting advertising entities, such as a mapping of keywords to additional keywords to implement keyword expansion.

Once an advertising entity associated with the textual advertisement is determined, the process 400 provides the text describing the advertising entity as a query to an image search engine (404). In response to providing the advertising entity as a query to an image search engine 110, the process 400 receives data identifying images responsive to the query (406). The data describes the ranking of the images according to an order of relevance to the query.

The process 400 selects images that are highest ranked in the order as the entity images (408). In some implementations, the images may be checked to determine whether the images are subject to a competitive restriction, e.g., an image for a product marketed by Company A may not be used for an advertisement for a competing product marketed by Company B. Such evaluation processes can include determining a domain name associated with the image, processing image metadata, watermark analysis, and object detection to identify objects and trade names, to name just a few. Provided the image is not subject to a competitive restriction, the process 400 associates the selected entity images with the textual advertisement. Data associating the selected entity images and the textual advertisement is stored in the image data 132.

Example Process for Image Selection from Vertical Images

With respect to the vertical images, verticals are determined for the textual advertisement, by for example scanning the textual advertisement for keywords associated with a vertical. For example, the keyword "smart-phone" could be associated with the vertical "electronics" or "mobile phone." In such case, the advertisement image system 130 would identify the keyword "smart-phone", and rank images associated with the vertical "electronics" or "mobile phone" and select the highest ranking images for association with the textual advertisement. Data associating the highest ranked one or more images with the textual advertisement are then stored in the image data 132.

FIG. 5 is a flow diagram of an example process 500 for selecting an image to associate with the textual advertisement, based on a vertical associated with the textual advertisement. The process 500 can be implemented in the advertisement image system 130, e.g., one or more computers and associated storage devices. The process is described in the context of an iterative example to illustrate the selection of an image to associate with the textual advertisement and how an image is selected based on the advertisement entity. The process 500 can be modified to operate in parallel with other processes so that the selected image is selected from the output of more than one process, depending on the system architecture used and processing capabilities available.

The process 500 determines a vertical for the textual advertisement (502). Verticals can specify a group of similar business or industries. For example, the textual advertisement may include the text "smart phone," and this term may be associated with a particular vertical in a vertical association accessible by the advertisement image system 130. In such case, the process 500 determines that the advertising vertical associated with phone is, for example, "electronics" or "mobile-phones."

The process 500 selects one or more vertical images based on the vertical of the textual advertisement (504). For example, the process 500 accesses a pre-defined association of images to verticals specifying associations of images with verticals, and selects an image associated with the vertical "electronics" or "mobile-phone." For example, the vertical "mobile-phone" may be associated with a set of images each including a brand obfuscated mobile phone. Similarly, the vertical "electronics" can be associated with a set of images each including a brand obfuscated consumer electronic device.

The process 500 associates the selected vertical images with the textual advertisement. The association data associating the selected one or more images with textual advertisement are stored in the image data 132. Additionally, as described with respect to the process 400 above, the images can be processed to determine if they are subject to competitive restrictions.

Additional Implementation Details

The processes described above can be used to select an image for textual advertisements that the advertiser has not specified an associated image. The highest ranking images obtained using these methods are sorted and compared based on rules specified by the advertisement image system 130. The advertisement image system 130 is responsible for selecting one or more highest ranking images, provided by the discussed methods, for association with each textual advertisement. In some embodiments, rules further specifying method preferences are stored in the advertisement image system 130. For example, weights can be used to indicate that a landing page image is of higher preference than an entity image, and that an entity image is of higher preference than a vertical image. In such case, the advertisement image system is more likely to associate a landing page image with a textual advertisement that is identified to be highly relevant to the landing page image and a vertical image.

In some implementations in which multiple images may be associated with an advertisement, historical performance data is recorded to determine which image performs the best for a particular textual advertisement. As a particular image emerges to yield the best performance, the particular image is selected more often over other associated images. In other implementations, machine learning can be used to determine such preferences.

In some implementations, the ad image system 130 can implement machine learning to build one or more models that are used in the selection of images for textual advertisements. For example, in some implementations, the ad image system 130 implements separate models that each respectively predicts the performance of a textual advertisement when shown with an entity based image, a landing page image, and a vertical image. The output of each predictive model (e.g., the output of an entity based image model, a landing page image model, and a vertical image model) can be compared to determine the image with the highest predicted performance. The image for which the highest predicted performance is then selected by the ad image system 130 for serving with the textual advertisement. In variations of these implementations, a single model can be trained for all of the image types.

The machine learning processes can take into account historical performance and various feature sets, such as landing page features (e.g., colors, text, vertical, domain), text advertisement features (e.g., terms, verticals), image features, audience features, and other features that can be used for model training features. Additionally, variety of different machine learning algorithms and training techniques can be used to generate the predictive models.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Figure 6:
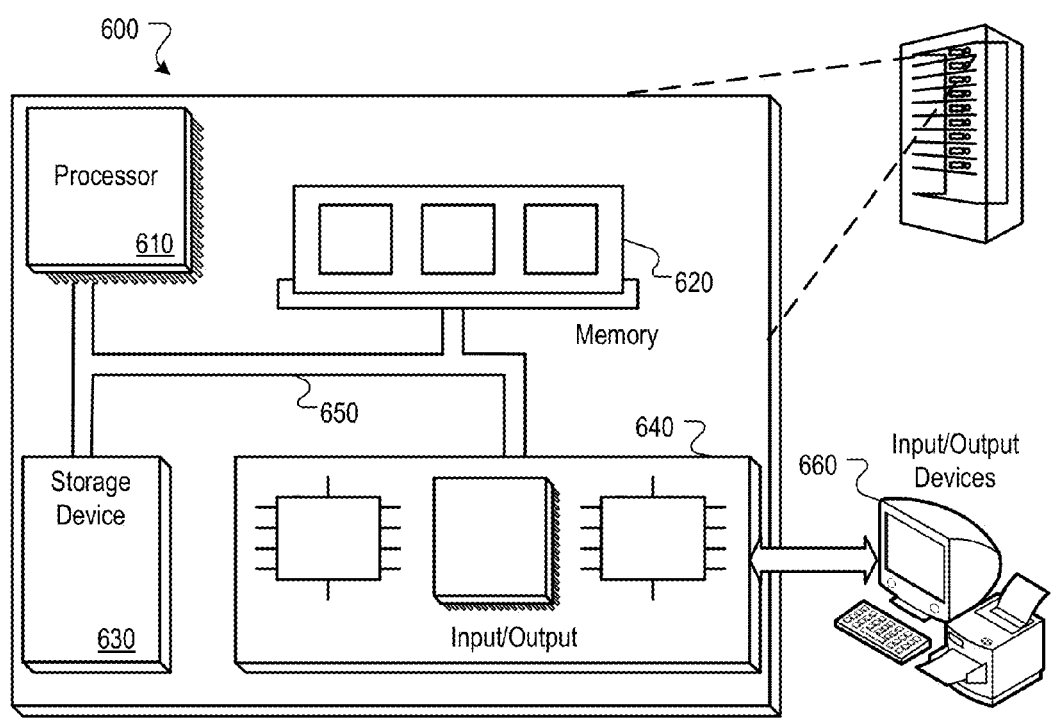
FIG. 6 is an example computer system.

On such example apparatus is shown in FIG. 6, which is an example computer system. The system 600 and includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    identifying, by a computer, a text content item that does not include an image and is linked to a landing page to which the text content item redirects users in response to user interaction with the text content item;
    identifying one or more images that are included in the landing page;
    in response to determining that the landing page includes a relevant image having at least a pre-specified measure of relevance to text of the text content item, selecting, for presentation with the text content item, a particular image from the landing page based on a measure of relevance of the particular image to the text content item; and
    providing, in response to a request for the text content item, data that presents the particular image with the text content item.

2. The method of claim 1, wherein selecting a particular image from the one or more images comprises selecting an image that has a highest measure of relevance to the text content item from the one or more images.

3. The method of claim 1, further comprising determining the measure of relevance of the image to the text content item based at least in part on a measure of relevance of the content of the landing page to the text content item.

4. The method of claim 1, further comprising:
    identifying an advertising entity associated with the text content item;
    providing data identifying the advertising entity as a query to an image search engine;
    receiving, from the image search engine, data identifying images responsive to the query, the images being ranked according to an order of relevance to the query; and
    selecting one or more images that are highest ranked in the order as the entity images;
    providing at least one of the one or more images for presentation with the text content item.

5. The method of claim 1, further comprising identifying one or more vertical images based on a vertical for the text content item, and in response to determining that the landing page does not include a relevant image, providing the vertical image for presentation with the content item.

6. The method of claim 1, further comprising:
    identifying one or more entity images based on an advertising entity for the text content item,
    identifying one or more vertical images based on a vertical for the text content item;
    in response to determining that the landing page does not include a relevant image, selecting a first image from the entity images and the vertical images for presentation with the text content item; and
    in response to determining that the landing page does not include a relevant image, providing the first image for presentation with the content item.

7. The method of claim 1, further comprising:
    receiving requests for textual content item;
    for each textual content item that an advertiser has specified an image to be displayed with the textual content item, providing the textual content item and the image specified by the advertiser; and
    for each textual content item that an advertiser has not specified an image to be displayed with the textual content item, selecting one of the landing page images associated with the textual content item and providing the textual content item and the selected landing page image.

8. A system, comprising:
    a data processing apparatus;
    a memory storage apparatus in data communication with the data processing apparatus and storing instructions executable by the data processing apparatus and that upon such execution cause the data processing apparatus to perform operations comprising:
    identifying, by the data processing apparatus, a text content item that does not include an image and is linked to a landing page to which the text content item redirects users in response to user interaction with the text content item;
    identifying one or more images that are included in the landing page;
    in response to determining that the landing page includes a relevant image having at least a pre-specified measure of relevance to text of the text content item, selecting, for presentation with the text content item, a particular image from the landing page based on a measure of relevance of the particular image to the text content item; and
    providing, in response to a request for the text content item, data that presents the particular image with the text content item.

9. The system of claim 8, wherein selecting a particular image from the one or more images comprises selecting an image that has a highest measure of relevance to the text content item from the one or more images.

10. The system of claim 8, wherein the operations further comprise determining the measure of relevance of the image to the text content item based at least in part on a measure of relevance of the content of the landing page to the text content item.

11. The system of claim 8, wherein the operations further comprise:
- identifying an advertising entity associated with the text content item;
- providing data identifying the advertising entity as a query to an image search engine;
- receiving, from the image search engine, data identifying images responsive to the query, the images being ranked according to an order of relevance to the query; and
- selecting one or more images that are highest ranked in the order as the entity images;
- providing at least one of the one or more images for presentation with the text content item.

12. The system of claim 8, wherein the operations further comprise identifying one or more vertical images based on a vertical for the text content item, and in response to determining that the landing page does not include a relevant image, providing the vertical image for presentation with the content item.

13. The system of claim 8, wherein the operations further comprise:
- identifying one or more entity images based on an advertising entity for the text content item,
- identifying one or more vertical images based on a vertical for the text content item;
- in response to determining that the landing page does not include a relevant image, selecting a first image from the entity images and the vertical images for presentation with the text content item; and
- in response to determining that the landing page does not include a relevant image, providing the first image for presentation with the content item.

14. The system of claim 8, wherein the operations further comprise:
- receiving requests for textual content item;
- for each textual content item that an advertiser has specified an image to be displayed with the textual content item, providing the textual content item and the image specified by the advertiser; and
- for each textual content item that an advertiser has not specified an image to be displayed with the textual content item, selecting one of the landing page images associated with the textual content item and providing the textual content item and the selected landing page image.

15. A non-transitory computer storage apparatus storing instructions executable by a data processing apparatus and that upon such execution cause the data processing apparatus to perform operations comprising:
- identifying a text content item that does not include an image and is linked to a landing page to which the text content item redirects users in response to user interaction with the text content item;
- identifying one or more images that are included in the landing page;
- in response to determining that the landing page includes a relevant image having at least a pre-specified measure of relevance to text of the text content item, selecting, for presentation with the text content item, a particular image from the landing page based on a measure of relevance of the particular image to the text content item; and
- providing, in response to a request for the text content item, data that presents the particular image with the text content item.

16. The computer storage apparatus of claim 15, wherein selecting a particular image from the one or more images comprises selecting an image that has a highest measure of relevance to the text content item from the one or more images.

17. The computer storage apparatus of claim 15, wherein the operations further comprise determining the measure of relevance of the image to the text content item based at least in part on a measure of relevance of the content of the landing page to the text content item.

18. The computer storage apparatus of claim 15, wherein the operations further comprise:
- identifying an advertising entity associated with the text content item;
- providing data identifying the advertising entity as a query to an image search engine;
- receiving, from the image search engine, data identifying images responsive to the query, the images being ranked according to an order of relevance to the query; and
- selecting one or more images that are highest ranked in the order as the entity images;
- providing at least one of the one or more images for presentation with the text content item.

19. The computer storage apparatus of claim 15, wherein the operations further comprise identifying one or more vertical images based on a vertical for the text content item, and in response to determining that the landing page does not include a relevant image, providing the vertical image for presentation with the content item.

20. The computer storage apparatus of claim 15, wherein the operations further comprise:
- identifying one or more entity images based on an advertising entity for the text content item,
- identifying one or more vertical images based on a vertical for the text content item;
- in response to determining that the landing page does not include a relevant image, selecting a first image from the entity images and the vertical images for presentation with the text content item; and
- in response to determining that the landing page does not include a relevant image, providing the first image for presentation with the content item.

* * * * *